United States Patent [19]
Fyfe

[11] Patent Number: 6,135,184
[45] Date of Patent: Oct. 24, 2000

[54] PNEUMATIC TIRE WITH CARCASS HALF PLIES AND METHOD OF MANUFACTURE

[75] Inventor: Eric Thomas Watson Fyfe, Solihull, United Kingdom

[73] Assignee: Sumitomo Rubber Industries, Ltd., Hyogo-ken, Japan

[21] Appl. No.: 09/189,836

[22] Filed: Nov. 12, 1998

[30] Foreign Application Priority Data

Nov. 15, 1997 [GB] United Kingdom ................... 9724053

[51] Int. Cl.⁷ ........................... B29D 30/30; B29D 30/32; B60C 9/02; B60C 15/00; B60C 15/05
[52] U.S. Cl. ........................... 152/550; 152/548; 156/117; 156/133
[58] Field of Search .................................. 152/548, 550, 152/551; 156/117, 133

[56] References Cited

U.S. PATENT DOCUMENTS 5,858,138  1/1999  Jara ........................................ 152/551
5,861,073  1/1999  Gazuit et al. ....................... 156/133 X

FOREIGN PATENT DOCUMENTS 10-226203  8/1998  Japan ..................................... 152/550

*Primary Examiner*—Adrienne C. Johnstone

[57] ABSTRACT

A pneumatic tire comprises a ground contacting tread including a tread strip extending axially between tread edges and sidewalls extending radially inwardly from each tread edge to respective bead regions, the tread being reinforced by at least a first circumferentially extending breaker ply, characterized in that each sidewall is reinforced by a carcass half ply extending from a radially inward first edge in the bead region to a radially outward second edge in the tread axially between the center and adjacent edge of the breaker ply; the carcass half ply including one or more reinforcing elements wound continuously between the radially inner and outer edges of the carcass half ply and around the circumferential periphery of the tire.

14 Claims, 3 Drawing Sheets

PNEUMATIC TIRE WITH CARCASS HALF PLIES AND METHOD OF MANUFACTURE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to a preumatic tire and particularly but not exclusively to a radial tire and provides a construction improved in materials usage and a manufacturing method improved in cost efficiency.

2. Description of the Related Art Including Information Disclosed Under 37 CFR 1.97 and 1.98

Conventional pneumatic tires have a reinforced carcass extending between two wheelrim contacting bead regions through sidewall regions and a ground contacting tread region. Inflation pressure within the cavity formed by mounting the tire onto the wheelrim tensions the carcass and thus provides the primary load support mechanism.

In a modern radial tire construction the carcass is reinforced by a ply of tire fabric comprising radially or substantially radially orientated cords which extend through the carcass continuously from one bead region to the other through the sidewalls and tread. These carcass cords are anchored in each bead region by being folded around an inextensible circumferentially extending bead core or hoop to form ply turn-up portions.

Furthermore in the tread region of the conventional radial tire the ground contacting rubber tread strip is also reinforced by a substantially inextensible belt or breaker taking the form of a cylindrical band. The belt or breaker is disposed radially outward and adjacent to the carcass ply and inward of the rubber tread strip and any tread pattern formed therein. This belt or breaker has substantially the same axial width as the tire tread and functions to keep the tread flat on the road surface. Breakers conventionally comprise plural plies of tire fabric having parallel cords which are inclined to the tire circumferential direction and crossed with respect to the cords of adjacent plies. Breaker plies may comprise organic cords or glass fibers but are usually steel coris.

In tires of the older so-called "crossply" construction the carcass comprises usually two or more plies having cords inclined to the tire circumferential direction and crossed with respect to the cords of adjacent carcass plies. Such crossply tires may also be fitted with breakers in the tread in a so-called 'bias belted' tires.

Thus is became clear to the Inventor of the present application in studying general aspects of tire construction that a substantial proportion of tires have a surfeit of reinforcement in certain regions and particularly tires which benefit from the presence of a belt or breaker in the tread strip have a more than adequate level of total reinforcement in the tread region.

BRIEF SUMMARY OF THE INVENTION

It is therefore an object of tie present invention to provide a tire having an improved utilization of materials in the construction of the carcass.

A further object of the invention is to provide a method of manufacturing the ti e of the invention which is more cost efficient.

According to one aspect of the invention a pneumatic tire comprises a ground contacting tread strip extending axially between tread edges and sidewalls extending radially inwardly from each tread edge to respective bead regions, the tread strip being reinforced by at least a first circumferentially extending breaker ply, characterized in that each sidewall is reinforced by a carcass half ply extending from a radially inward first edge in the bead region to a radially outward second edge in the tread axially between the center and adjacent edge of the breaker ply and preferably overlapping at the radially outer side of the breaker ply, the carcass half ply comprising one or more reinforcing elements wound continuously between the radially inner and outer edges of the carcass half ply and around the circumferential periphery of the tire. Preferably the carcass half plies each overlap the narrowest breaker ply by between 15 and 35% of the axial width of the narrowest breaker ply.

According to another aspect of the invention a method of manufacturing a green or uncured tire carcass comprises assembling on .o a former a first breaker ply in the former central region and two inner bead cores in each of the former axial edge regions and subsequently forming two carcass half-plies radially outward of the breaker ply and bead cores by winding one or more continuous reinforcing elements zigzag between a first Edge axially outward of the inner bead core and a second edge axially between the breaker ply centerline and the adjacent breaker ply edge.

BRIEF DESCRIPTION OF THE SEVERAL VIEWS OF THE DRAWINGS

Further aspects of the intention will become apparent from the following description by way of example only of one embodiment in conjunction with the following schematic drawings in which.

DETAILED DESCRIPTION OF THE INVENTION

Figure 1:
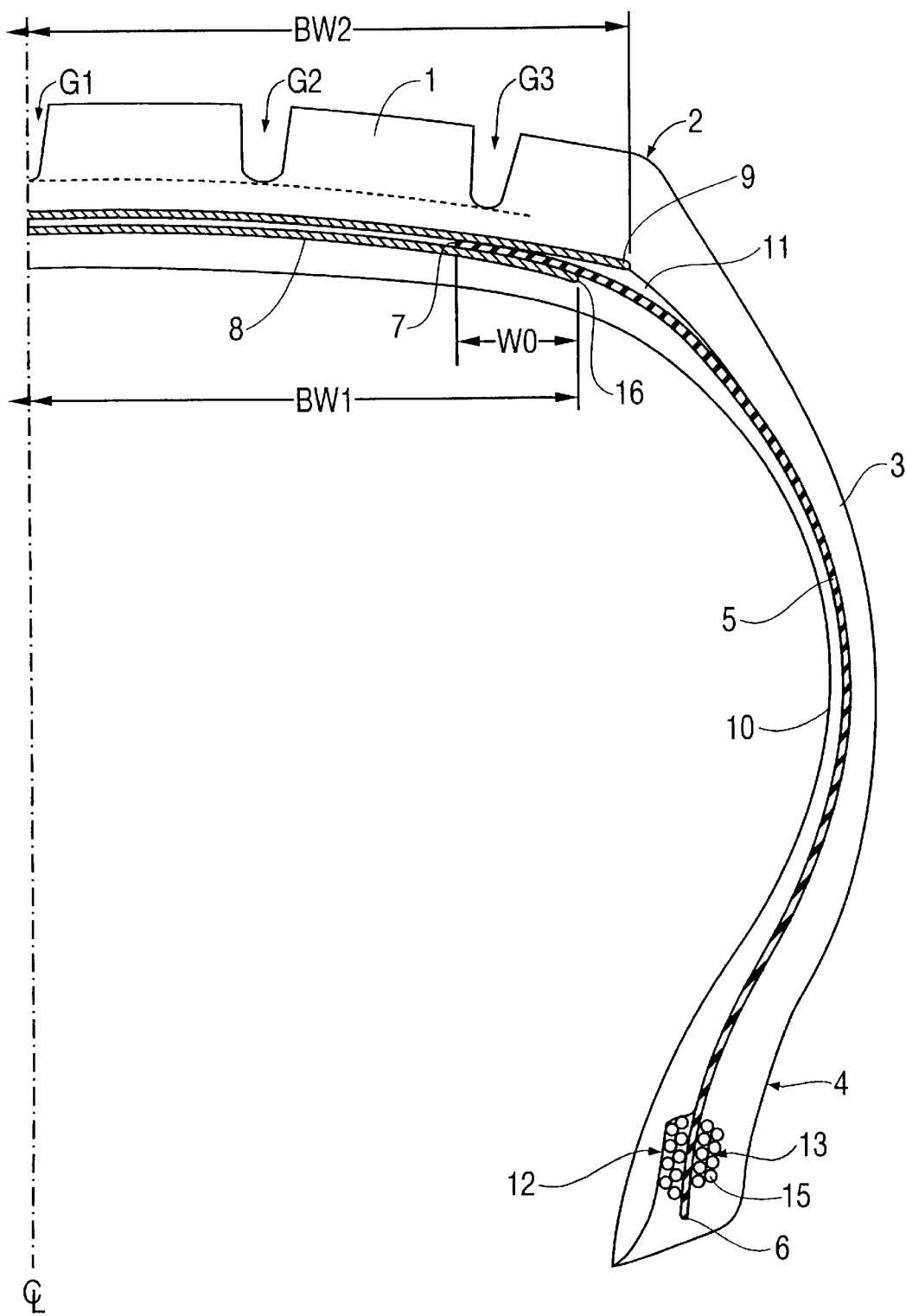
FIG. 1 shows a radial cross-section of one half of a tire in accordance with the invention.

The tire shown in FIG. 1 has a tread region comprising a ground contacting tread strip 1 extending between tread edges 2. Sidewalls 3 extend radially inwardly from each tread edge 2 to bead regions 4. On the radially inner surface of the tire there is a rubber innerliner 10 comprising a low air-permeability compound to provide retention of the inflation medium.

The tread region of the tire is reinforced between the tread edges 2 by a breaker comprising two centrally disposed breaker plies 8 and 9. The radially outer breaker ply 9 has a width BW2 greater than the width BW1 of the inner breaker ply 8.

Each of the breaker plies 8 and 9 comprises parallel steel cords inclined at an angle of 18°–22° to the tire circumferential direction. The cords of breaker ply 8 are crossed with respect to those of adjacent breaker ply 9.

The breaker is disposed radially inward of the tread strip and the tread pattern formed therein which is represented in FIG. 1 by tread grooves G1–G3.

In accordance with the invention each of the sidewalls 3 of the tire is reinforced by a carcass half-ply 5 which extends between a radially inward first edge 6 in the bead region 4 and a radially outer second edge 7 in the tread region.

In the tread region, the radially outward second edge 7 of the carcass half-ply 5 is disposed radially between the breaker plies 8 and 9. The half-ply 5 overlaps the axially outer part of the narrower inner first breaker ply 8 on its radially outer side by a distance Wo equal in this embodiment to 20% and preferably between 15% and 35% of the width BW1 of the narrower first breaker ply 8.

As can be seen the radially outer end portion of the carcass half-ply 5 is disposed between the inner and outer breaker plies 8 and 9 and is thus even more securely fixed into the tread reinforcing breaker. As is common in the art a breaker cushion rubber 11 may be disposed radially inward of the axial outer portion of the widest breaker Fly 9 to support the breaker ply and separate it from carcass half-ply 5.

At the radially inward end of the carcass half-ply 5 is secured in the bead region 4 by virtue of being held between axially inner and outer bead cores 12 and 13 respectively which each comprise a circumferentially extending inextensible hoop comprising a bundle of one or more bead wires 15. The bead wires 15 may comprise any common in the art such as single strand wire, twisted wires or multi-filaments in the form of cables.

It should be noted that in the tire of FIG. 1 there is no conventional carcass turn-up portion.

Figure 2:
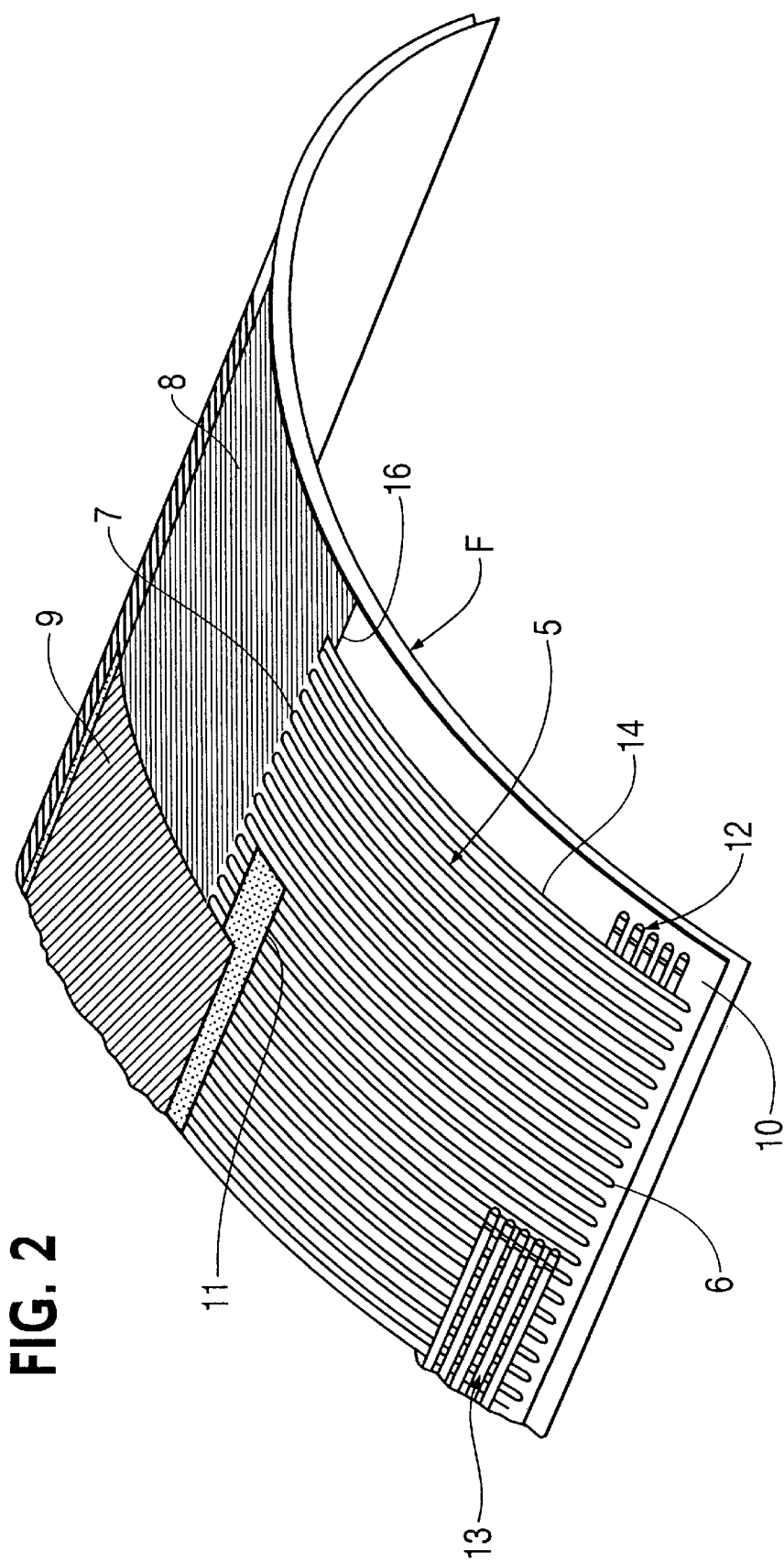
FIG. 2 shows an isometric view of the assembly of some of the components of the tire on a tire building former.

As can be seen in FIG. 2 each carcass half-ply 5 comprises one or more reinforcing elements 14 wound continuously between the radially inner and outer edges 6 and 7 and around the circumferential periphery of the tire sidewall.

Preferably the reinforcing elements are cords which may be formed from those materials common in the art such as steel or textile including glass fibers or organic fibers such as nylon, rayon, polyester or aramid.

Also preferably the reinforcing elements are coated or embedded in rubber to form a tape in which the reinforcing elements extend longitudinally. Most preferably a narrow tape comprising a single reinforcing element is used.

Figure 3:
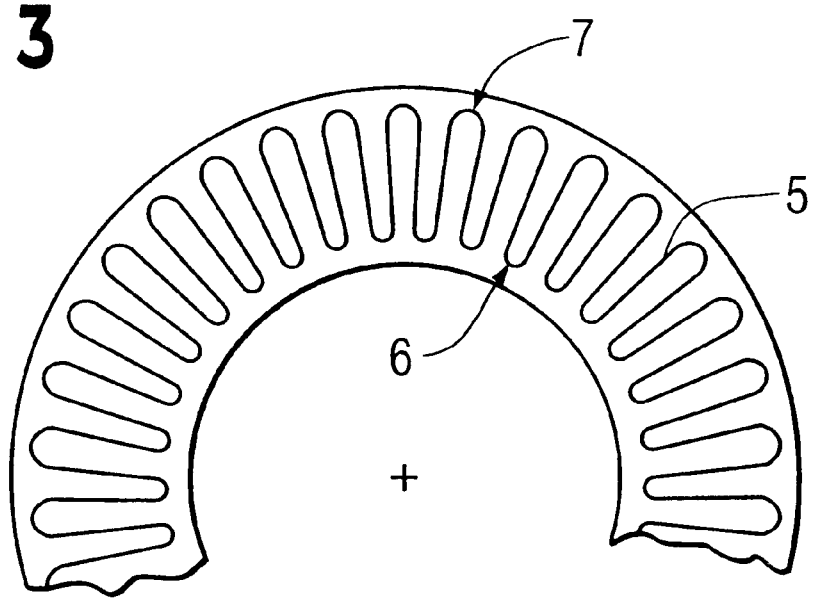
FIGS. 3 and 4 are schematic diagrams showing the zigzag winding of reinforcing elements located in the tire sidewall.
Figure 4:
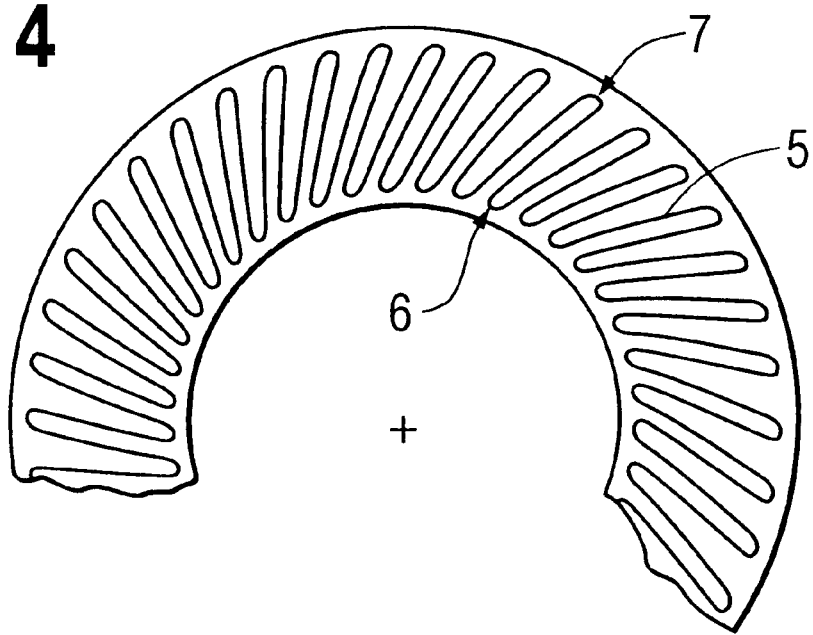

In this embodiment the reinforcing element or elements as shown in FIGS. 2 and 3 are wound zigzag between the edges such that they lie substantially radially. However they may be wound zigzag at an angle to the radial direction as shown in FIG. 4 or they may be woven knotted together between the edges.

The configuration of the carcass half-plies in the bead and tread regions permits the carcass reinforcement to adopt a natural position prior to vulcanization in the mould. This aids the elimination of localized stress areas in the carcass resulting in a reduction in non-uniformities within the tire giving improved ride comfort.

Where the reinforcing elements 14 are disposed zigzag between the half-ply edges 6 and 7 it is preferred to form each half-ply at the time of building or assembling the tire components into the uncured or green tire carcass by winding the reinforcing element or element formed into a tape directly onto the rubber inner liner 10 on the tire building former F as shown in FIG. 2.

However what ever form the carcass half-ply reinforcement takes, be it zigzag, winding, woven or knitted elements, the half-plies may if preferred be formed in a separate operation prior to the assembly of the green carcass on the building former F.

The tire of the present invention may also be provided with a breaker cover ply radially outward of the breaker according to service requirement. This cover ply may comprise a single or plural wrap of a substantially full width ply or alternatively a so-called "jointless bandage" construction.

According to the above-described embodiment the present invention provides a tire and a method of manufacturing a green tire carcass which eliminates non-essential materials in the tread and bead regions and which therefore represents improved utilization of materials, reduced tire weight and more cost efficient manufacture.

The method of construction is also capable of aiding automation of the tire manufacturing process by forming the main carcass reinforcing, i.e. the carcass half-plies at the time of component assembly using a suitable machine to wind the reinforcement between the first and second edge.

Having now described my invention what I claim is:

1. A pneumatic tire comprising a ground contacting tread, comprising a tread strip extending axially between tread edges, and sidewalls extending radially inwardly from each tread edge to respective bead regions, the tread strip being reinforced by at least a first circumferentially extending breaker ply, wherein each sidewall is reinforced by a carcass half ply extending from a radially inward first edge in the bead region to a radially outward second edge in the tread axially between the center and adjacent edge of the breaker ply, the carcass half ply comprising one or more reinforcing elements wound continuously between the radially inner and outer edges of the carcass half ply and around the circumferential periphery of the tire.

2. A tire in accordance with claim 1, wherein the one or more reinforcing elements of the carcass half-plies are disposed substantially radially.

3. A tire in accordance with claim 1, wherein the one or more reinforcing elements of the carcass half plies is a single reinforcing element.

4. A tire according to claim 1, wherein each carcass half ply overlaps the radially outer side of the first breaker ply.

5. A tire according to claim 1, wherein the tread strip is reinforced by a second circumferentially extending breaker ply.

6. A tire in accordance with claim 5, wherein the second breaker ply is radially outward of the first breaker ply.

7. A tire in accordance with claim 6, wherein the second breaker ply overlies the radially outward edges of the two carcass half plies.

8. A tire in accordance with claim 7, wherein the axial width of the second breaker ply is greater than the axial width of the first breaker ply.

9. A tire in accordance with claim 1, wherein the carcass half plies each overlap the narrowest breaker ply by between 15 and 35% of the axial width of the narrowest breaker ply.

10. A tire in accordance with claim 1, wherein the one or more reinforcing elements are wound zigzag between the radially inward edge and the radially outward edge of each carcass half ply.

11. A tire according to claim 1, wherein in the region of the radially inward first edge each carcass half ply abuts a circumferentially extending inner bead core disposed within the bead region axially inward of the carcass half ply.

12. A tire according to claim 1, wherein in the region of the radially inward first edge each carcass half ply abuts a circumferentially extending outer bead core disposed within the bead region axially outward of the carcass half ply.

13. A tire in accordance with claim 1, wherein the one or more continuous reinforcing elements are rubber coated tire cords.

14. A method of building a uncured tire carcass on a tire building former comprising assembling onto the former a first breaker ply in the former central region and two inner bead cores in each of the former axial edge regions and subsequently forming two carcass half-plies radially outward of the breaker ply and bead cores by winding one or more continuous reinforcing elements zigzag between a first edge axially outward of the inner bead core and a second edge axially between the breaker ply centerline and the adjacent breaker ply edge.

* * * * *